United States Patent
Gallegos-Lopez et al.

(10) Patent No.: US 9,595,902 B2
(45) Date of Patent: Mar. 14, 2017

(54) METHODS, SYSTEMS AND APPARATUS FOR ADJUSTING MODULATION INDEX TO IMPROVE LINEARITY OF PHASE VOLTAGE COMMANDS

(75) Inventors: Gabriel Gallegos-Lopez, Lomita, CA (US); Milun Perisic, Torrance, CA (US); Michael H. Kinoshita, Redondo Beach, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 975 days.

(21) Appl. No.: 13/197,629

(22) Filed: Aug. 3, 2011

(65) Prior Publication Data

US 2013/0033206 A1 Feb. 7, 2013

(51) Int. Cl.
H02P 21/14 (2016.01)

(52) U.S. Cl.
CPC .............. *H02P 21/14* (2013.01); *H02P 21/18* (2016.02)

(58) Field of Classification Search
CPC   H02P 21/14; H02P 21/18; B60K 6/26; B60K 7/0007
USPC ......... 318/599, 400.01, 810, 400.14, 400.17, 318/400.23, 400.24, 400.25, 400.02, 811, 318/494; 700/46, 251, 250
See application file for complete search history.

(56) References Cited

U.S. PATENT DOCUMENTS

| | | | |
|---|---|---|---|
| 5,736,825 A * | 4/1998 | Kaura | G05B 11/28 318/599 |
| 6,002,226 A * | 12/1999 | Collier-Hallman | H02P 6/10 318/139 |
| 6,446,117 B1 * | 9/2002 | Gebauer | 709/217 |
| 7,199,540 B2 * | 4/2007 | Yaguchi | H02P 25/098 318/432 |
| 7,262,536 B2 * | 8/2007 | Rahman | B60K 6/26 180/65.51 |
| 7,332,837 B2 * | 2/2008 | Ward | H02K 1/182 310/52 |
| 7,525,269 B2 * | 4/2009 | Patel | H02P 25/03 318/432 |
| 7,592,765 B2 * | 9/2009 | Rahman | H02P 21/22 318/400.02 |
| 7,592,766 B2 * | 9/2009 | Patel | B60K 6/26 318/400.02 |
| 7,723,944 B2 * | 5/2010 | Kitanaka | H02P 21/02 318/800 |
| 7,969,106 B2 * | 6/2011 | Kitanaka | B60L 11/1803 318/400.02 |
| 7,986,116 B2 * | 7/2011 | Imura et al. | 318/400.15 |
| 8,080,957 B2 * | 12/2011 | Miura | B62D 5/046 318/400.01 |
| 8,115,430 B2 * | 2/2012 | Gallegos-Lopez | B60L 15/007 180/65.285 |

(Continued)

OTHER PUBLICATIONS

State Intellectual Property Office of the Peoples' Republic of China, Office Action for Chinese Patent Application No. 201210274776.3, mailed Jun. 27, 2014.

*Primary Examiner* — Rita Leykin
(74) *Attorney, Agent, or Firm* — Lorenz & Kopf, LLP (57) ABSTRACT

Embodiments of the present invention relate to methods, systems and apparatus for controlling operation of a multi-phase machine in a motor drive system. The disclosed embodiments provide a mechanism for adjusting modulation index of voltage commands to improve linearity of the voltage commands.

18 Claims, 5 Drawing Sheets

(56) References Cited

U.S. PATENT DOCUMENTS

| | | | | |
|---|---|---|---|---|
| 8,193,747 B2* | 6/2012 | Gallegos-Lopez | ..... | H02P 21/22 |
| | | | | 180/65.285 |
| 8,253,360 B2* | 8/2012 | Schulz | ................ | B60L 15/025 |
| | | | | 318/400.02 |
| 8,283,881 B2* | 10/2012 | Gallegos-Lopez | ..... | H02P 21/06 |
| | | | | 318/400.02 |
| 8,288,985 B2* | 10/2012 | Takahashi | ..................... | 318/812 |
| 8,339,094 B2* | 12/2012 | Perisic | .............. | H02M 7/53871 |
| | | | | 318/606 |
| 8,384,327 B2* | 2/2013 | Takahashi | ................. | 318/400.3 |
| 8,446,117 B2* | 5/2013 | Gallegos-Lopez | ..... | H02P 25/22 |
| | | | | 318/400.01 |
| 2003/0062868 A1* | 4/2003 | Mir | ......................... | H02P 6/14 |
| | | | | 318/599 |
| 2008/0100254 A1 | 5/2008 | Rahman et al. | | |
| 2009/0256518 A1* | 10/2009 | Kitanaka | ................ | H02P 21/02 |
| | | | | 318/802 |
| 2010/0066283 A1* | 3/2010 | Kitanaka | ............ | B60L 11/1803 |
| | | | | 318/400.02 |
| 2011/0221366 A1* | 9/2011 | Gallegos-Lopez | ..... | H02P 21/06 |
| | | | | 318/400.02 |
| 2011/0221367 A1* | 9/2011 | Perisic | ............. | H02M 7/53871 |
| | | | | 318/400.02 |

\* cited by examiner

METHODS, SYSTEMS AND APPARATUS FOR ADJUSTING MODULATION INDEX TO IMPROVE LINEARITY OF PHASE VOLTAGE COMMANDS

STATEMENT REGARDING FEDERALLY SPONSORED RESEARCH OR DEVELOPMENT

This invention was made with Government support under DE-FC26-07NT43123 awarded by the US-Department of Energy. The Government has certain rights in this invention.

TECHNICAL FIELD

Embodiments of the present invention generally relate to techniques for controlling operation of multi-phase systems, and more particularly relate to methods, systems and apparatus for adjusting phase voltages used to control a multi-phase machine.

BACKGROUND OF THE INVENTION

Electric machines are utilized in a wide variety of applications. For example, hybrid/electric vehicles (HEVs) typically include an electric traction drive system that includes a multi-phase alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain.

For instance, some traditional HEVs implement two three-phase pulse width modulated (PWM) inverter modules and two three-phase AC machines (e.g., AC motors) each being driven by a corresponding one of the three-phase PWM inverter modules that it is coupled to.

In such multi-phase systems, voltage command signals are applied to a pulse width modulation (PWM) module. The PWM module applies PWM waveforms to the phase voltage command signals to control pulse width modulation of the phase voltage command signals and generate switching vector signals that are provided to the PWM inverter module.

However, in many systems, due to factors such as switching limitations, and voltage drops in bus bars, terminals, and cables, the voltages that are applied at the machine terminals will exhibit non-linearity with respect to commanded phase voltages. As a result, the wrong phase voltage will be applied to the machine, and therefore, phase current may not be properly regulated, which may in turn cause current/torque oscillations.

It would be desirable to provide a mechanism for reducing or eliminating such non-linearities in the commanded phase voltages so that correct voltages will be applied at terminals of a multi-phase machine to help maintain proper phase current regulation. Other desirable features and characteristics of the present invention will become apparent from the subsequent detailed description and the appended claims, taken in conjunction with the accompanying drawings and the foregoing technical field and background.

SUMMARY

Embodiments of the present invention relate to methods, systems and apparatus for controlling operation of a multi-phase electric machine that is driven by a multi-phase PWM controlled inverter module of an electric motor drive system. In accordance with some of the disclosed, a method is provided for controlling a multi-phase electric machine that has a plurality of machine terminals. A modulation index (MI*) and a voltage angle (Vangle) are computed based on voltage command signals provided from a current regulator and a DC input voltage (Vdc).

Based on the modulation index (MI*) (and possibly a phase current (Iph)), an adjusted modulation index (MI*_adj) can be generated. The adjusted modulation index (MI*_adj) is used to adjust the voltage command signals and generate adjusted voltage command signals (Vd_adj*, Vq_adj*) so that the three-phase alternating current (AC) voltage signal waveforms that are eventually applied at the machine terminals will substantially match the voltage command signals.

Based on the adjusted modulation index (MI*_adj), the voltage angle (Vangle) and the DC input voltage (Vdc), adjusted voltage command signals (Vd_adj*, Vq_adj*) can be computed that can be used to generate switching vector signals (Sa . . . Sc). Based on switching vector signals (Sa . . . Sc) and the DC input voltage (Vdc), three-phase alternating current (AC) voltage signal waveforms can be generated and applied to the machine terminals. The adjustments applied to the voltage command signals to generate the adjusted voltage command signals (Vd_adj*, Vq_adj*) cause magnitudes of the phase voltage command signals to be adjusted to substantially match the machine terminal voltages despite non-linearities in the electric motor drive system.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of a multi-phase system. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of a multi-phase system, as described herein. As such, these functions may be interpreted as steps of a method for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods, systems and apparatus for controlling operation of a multi-phase system that can be implemented, for example, in operating environments such as a hybrid/electric vehicle (HEV). Embodiments of the present invention relate to methods, systems and apparatus for adjusting a modulation index so that the voltages applied at the machine's terminals are made more linear with respect to the commanded phase voltages. In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field.

Figure 1:
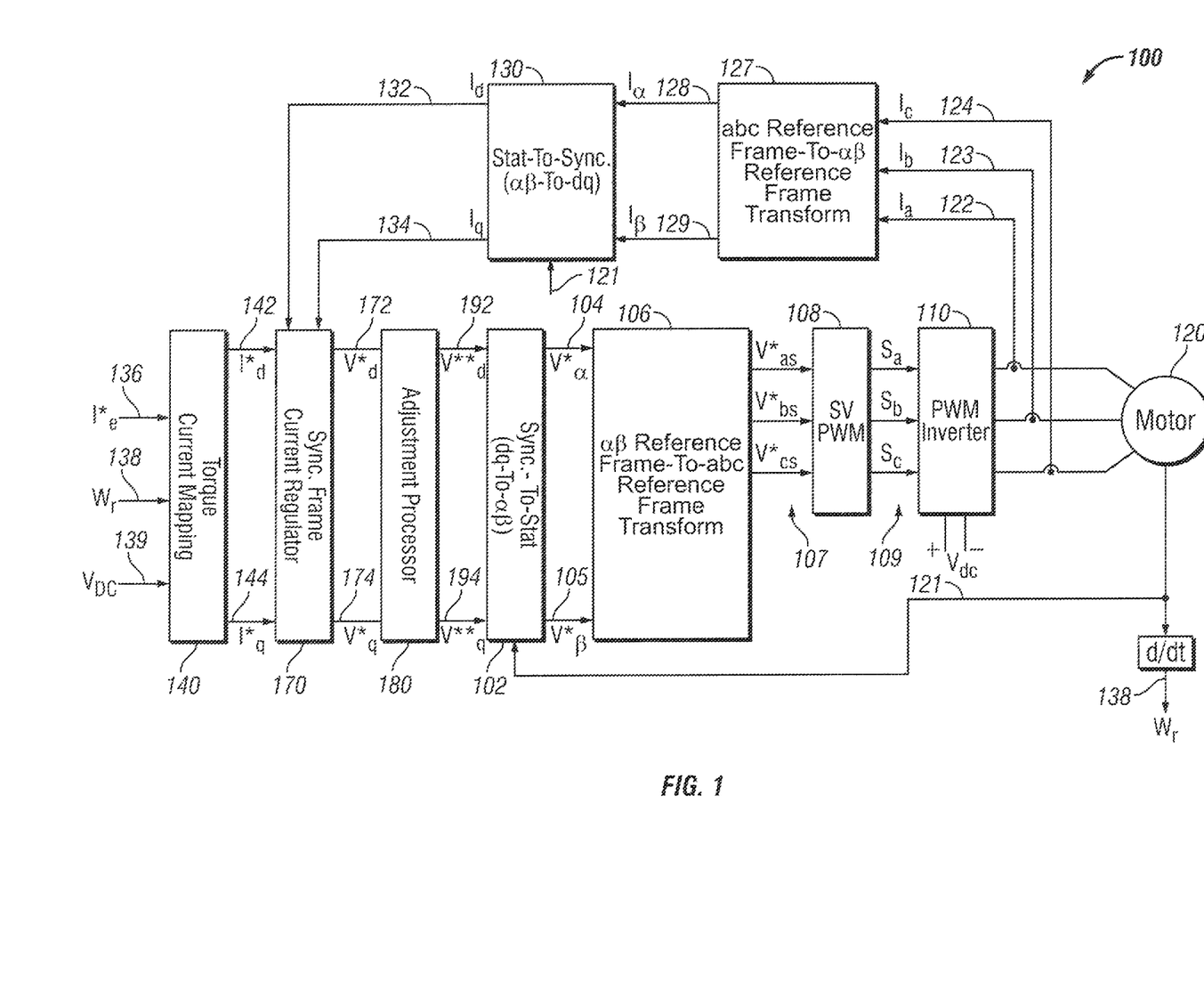
FIG. 1 is a block diagram of one example of a vector controlled motor drive system in accordance with some of the disclosed embodiments.

FIG. 1 is a block diagram of one example of a vector controlled motor drive system 100 in accordance with the disclosed embodiments. The system 100 controls a three-phase AC machine 120 via a three-phase pulse width modulated (PWM) inverter module 110 coupled to the three-phase AC machine 120 so that the three-phase AC machine 120 can efficiently use a DC input voltage (Vdc) provided to the three-phase PWM inverter module 110 by adjusting current commands that control the three-phase AC machine 120. In one particular implementation, the vector controlled motor drive system 100 can be used to control torque in an HEV.

In the following description of one particular non-limiting implementation, the three-phase AC machine 120 is described as a three-phase AC powered motor 120, and in particular a three-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes fewer or more phases.

The three-phase AC motor 120 is coupled to the three-phase PWM inverter module 110 via three inverter poles and generates mechanical power (Torque×Speed) based on three-phase sinusoidal current signals received from the PWM inverter module 110. In some implementations, the angular position of a rotor (θr) of the three-phase AC motor 120 or "shaft position" is measured using a position sensor (not illustrated), and in other implementations, the angular position of a rotor (θr) of the three-phase AC motor 120 can be estimated without using a position sensor by using sensorless position estimation techniques.

Figure 2:
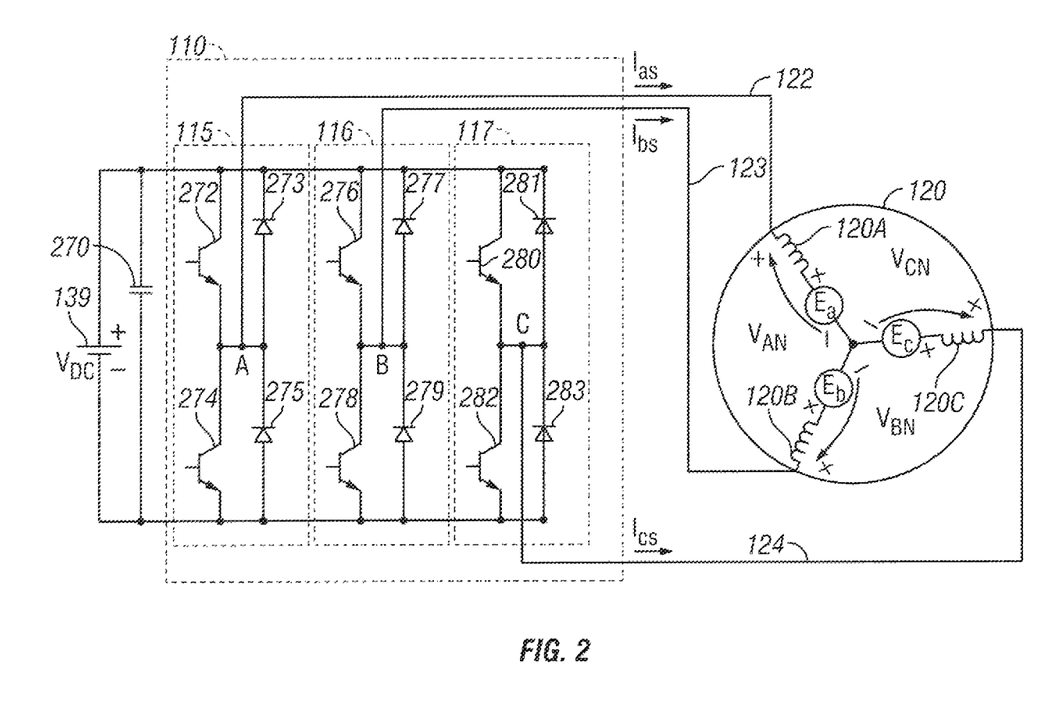
FIG. 2 is a block diagram of a portion of a motor drive system including a three-phase voltage source inverter module connected to a three-phase AC motor.

Prior to describing operation details of the system 100, a more detailed description of one exemplary implementation of the three-phase voltage source inverter 110 will be provided (including how it is connected to the three-phase AC motor 120) with reference to FIG. 2.

FIG. 2 is a block diagram of a portion of a motor drive system including a three-phase voltage source inverter 110 connected to a three-phase AC motor 120. It should be noted that the three-phase voltage source inverter 110 and the three-phase motor 120 in FIG. 1 are not limited to this implementation; rather, FIG. 2 is merely one example of how the three-phase voltage source inverter 110 and the three-phase motor 120 in FIG. 1 could be implemented in one particular embodiment.

As illustrated in FIG. 2, the three-phase AC motor 120 has three stator or motor windings 120a, 120b, 120c, connected to motor terminals A, B, C, and the three-phase PWM inverter module 110 includes a capacitor 270 and three inverter sub-modules 115-117. In this particular embodiment, in phase A the inverter sub-module 115 is coupled to motor winding 120a, in phase B the inverter sub-module 116 is coupled to motor winding 120b, and in phase C the inverter sub-module 117 is coupled to motor winding 120c. The current into motor winding A 120a flows out motor windings B, C 120b-120c, the current into motor winding B 120b flows out motor windings A and C, 120a, 120c, and the current into motor winding C 120c flows out motor windings A and B, 120a, 120b.

The resultant phase or stator currents (Ia-Ic) 122, 123, 124, flow through respective stator windings 120a-c. The phase to neutral voltages across each of the stator windings 120a-120c are respectively designated as $V_{AN}$, $V_{BN}$, $V_{CN}$, with the back electromotive force (EMF) voltages generated in each of the stator windings 120a-120c respectively shown as the voltages $E_a$, $E_b$, $E_c$, produced by ideal voltage sources, each respectively shown connected in series with stator windings 120a-120c. As is well known, these back EMF voltages $E_a$, $E_b$, $E_c$, are the voltages induced in the respective stator windings 120a-120c by the rotation of the permanent magnet rotor. Although not shown, the motor 120 is coupled to a drive shaft.

The inverter 110 includes a capacitor 270, a first inverter sub-module 115 comprising a dual switch 272/273, 274/275, a second inverter sub-module 116 comprising a dual switch 276/277, 278/279, and a third inverter sub-module 117 comprising a dual switch 280/281, 282/283. As such, inverter 110 has six solid state controllable switching devices 272, 274, 276, 278, 280, 282, and six diodes 273, 275, 277, 279, 281, 283, to appropriately switch compound voltage ($V_{DC}$) and provide three-phase energization of the stator windings 120a, 120b, 120c of the three-phase AC motor 120.

Although not illustrated, a closed loop motor controller can receive motor command signals and motor operating signals from the motor 120, and generate control signals for controlling the switching of solid state switching devices 272, 274, 276, 278, 280, 282 within the inverter sub-modules 115-117. By providing appropriate control signals to the individual inverter sub-modules 115-117, the closed loop motor controller controls switching of solid state switching devices 272, 274, 276, 278, 280, 282, within the inverter sub-modules 115-117 and thereby controls the outputs of the inverter sub-modules 115-117 that are provided to motor windings 120a-120c, respectively. The resultant stator currents (Ia . . . Ic) 122-124 that are generated by the inverter sub-modules 115-117 of the three-phase inverter module 110 are provided to motor windings 120a, 120b, 120c. The voltages as $V_{AN}$, $V_{BN}$, $V_{CN}$, and the voltage at node N fluctuate over time depending on the open/close states of switches 272, 274, 276, 278, 280, 282 in the inverter sub-modules 115-117 of the inverter module 110, as will be described below.

Referring again to FIG. 1, the vector control motor drive system 100 includes a torque-to-current mapping module 140, a synchronous (SYNC.) frame current regulator module 170, a voltage command adjustment processor 180, a synchronous-to-stationary (SYNC.-TO-STAT.) transformation module 102, an αβ reference frame-to-abc reference frame (αβ-to-abc) transformation module 106, a pulse width modulation (PWM) module 108, a three-phase PWM inverter 110, an abc reference frame-to-αβ reference frame (abc-to-αβ transformation module 127, and a stationary-to-synchronous (STAT.-TO-SYNC.) transformation module 130.

The torque-to-current mapping module 140 receives a torque command signal (Te*) 136, angular rotation speed (ωr) 138 of the shaft that is generated based on the derivative of the rotor/shaft position output (θr) 121, and the DC input voltage ($V_{DC}$) 139 as inputs, along with possibly a variety of other system parameters depending upon implementation. The torque-to-current mapping module 140 uses these inputs to generate a d-axis current command (Id*) 142 and a q-axis current command (Iq*) 144 that will cause the motor 120 to generate the commanded torque (Te*) at speed (ωr) 138. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time.

The abc-to-αβ transformation module 127 receives the measured three-phase stationary reference frame feedback stator currents (Ia . . . Ic) 122-124 that are fedback from motor 120. The abc-to-αβ transformation module 127 uses these three-phase stationary reference frame feedback stator currents 122-124 to perform an abc reference frame-to-αβ reference frame transformation to transform the three-phase stationary reference frame feedback stator currents 122-124 into stationary reference frame feedback stator currents (Iα, Iβ) 128, 129. The abc-to-αβ transformation is well-known in the art and for sake of brevity will not be described in detail.

The stationary-to-synchronous transformation module 130 receives the stationary reference frame feedback stator currents (Iα, Iβ) 128, 129 and the rotor angular position (θr) 121 and generates (e.g., processes or converts) these stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are DC commands that have a constant value as a function of time for steady state operation. The process of current to voltage conversion can be implemented as a Proportional-Integral (PI) controller, which is known in the art and for sake of brevity will not be described in detail. Because the current commands are DC signals in the synchronous reference frame they are easier to regulate in comparison to AC stationary reference frame current commands. However, switching limitations of the switches 272, 274, 276, 278, 280, 282, and voltage drops in bus bars, terminals, cables and inverter 110 can introduce non-linearities in the synchronous reference frame d-axis voltage command signal (Vd*) 172 and the synchronous reference frame q-axis voltage command signal (Vq*) 174, which propagate through and result in non-linearities in the voltages that are applied at the machine's terminals with respect to commanded phase voltage. As will be described below, the disclosed embodiments can provide methods, systems and apparatus for adjusting the commanded phase voltages 172, 174 to reduce and/or eliminate non-linearities in the voltages that are applied at the machine's terminals with respect to commanded phase voltage.

The voltage command adjustment processor 180 receives the synchronous reference frame d-axis voltage command signal (Vd*) 172 and the synchronous reference frame q-axis voltage command signal (Vq*) 174. The voltage command adjustment processor 180 processes these voltage command signals 172, 174 to generate an adjusted synchronous reference frame d-axis voltage command signal (Vd_adj*) 192 and an adjusted synchronous reference frame q-axis voltage command signal (Vq_adj*) 194. The adjusted voltage command signals (Vd_adj*, Vq_adj*) 192, 194 are adjusted such that linearity of the output voltage signals generated by the inverter module 110 can be improved. Further detail regarding operation of the voltage command adjustment processor 180 will be described below with reference to FIG. 3.

The synchronous-to-stationary transformation module 102 receives the adjusted voltage command signals (Vd_adj*, Vq_adj*) 192, 194 as inputs along with the rotor position output (θr) 121. In response to the adjusted voltage command signals (Vd_adj*, Vq_adj*) 192, 194 and the measured (or estimated) rotor position angle (θr) 121, the synchronous-to-stationary transformation module 102 performs a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave as a function of time. The process of synchronous-to-stationary conversion is well-known in the art and for sake of brevity will not be described in detail.

The αβ-to-abc transformation module 106 receives the stationary reference frame voltage command signals (Vα*, Vβ*) 104, 105, and based on these signals, generates stationary reference frame voltage command signals (Vas* ... Vcs*) 107 (also referred to as "phase voltage command signals") that are sent to the PWM module 108. The αβ-to-abc transformation is well-known in the art and for sake of brevity will not be described in detail.

The three-phase PWM inverter module 110 is coupled to the PWM module 108. The PWM module 108 is used for the control of pulse width modulation (PWM) of the phase voltage command signals (Vas* ... Vcs*) 107. The switching vector signals (Sa ... Sc) 109 are generated based on duty cycle waveforms that are not illustrated in FIG. 1, but are instead internally generated at the PWM module 108 to have a particular duty cycle during each PWM period. The PWM module 108 modifies the phase voltage command signals (Vas* ... Vcs*) 107 based on the duty cycle waveforms (not illustrated in FIG. 1) to generate switching vector signals (Sa ... Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered machine 120 at varying speeds based on the DC input 139.

The switching vector signals (Sa ... Sc) 109 control the switching states of switches in PWM inverter 110 to generate three-phase voltage commands at each phase A, B, C. The switching vector signals (Sa ... Sc) 109 are PWM waveforms that have a particular duty cycle during each PWM period that is determined by the duty cycle waveforms that are internally generated at the PWM module 108. The three-phase voltage source inverter module 110 must be controlled so that at no time are both switches in the same inverter sub-module 115-117 or "leg" are turned on to prevent the DC supply from being shorted. As such, the switches in the same inverter sub-module 115-117 are operated such that when one is off the other is on and vice versa. To explain further, in a given phase (A ... C) at any particular time, one of the switches is off and the other one of the switches is on (i.e., the two switches in a particular inverter sub-module must have opposite on/off states). As one example with respect to phase A, when switch 272 is on, switch 274 is off, and vice-versa. As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0).

The three-phase PWM inverter module 110 receives the DC input voltage (Vdc) and switching vector signals (Sa ... Sc) 109, and uses them to generate three-phase alternating current (AC) voltage signal waveforms at inverter poles that drive the three-phase AC machine 120 at varying speeds (ωr).

The three-phase machine 120 receives the three-phase voltage signals generated by the PWM inverter 110 and generates a motor output at the commanded torque Te* 136. In this particular implementation, the machine 120 comprises a three-phase interior permanent-magnet synchronous motor (IPMSM) 120, but the disclosed embodiments can be any multi-phase AC machine having any number of phases.

Although not illustrated in FIG. 1, the system 100 may also include a gear coupled to and driven by a shaft of the three-phase AC machine 120. The measured feedback stator currents (Ia-Ic) 122-124 are sensed, sampled and provided to the abc-to-αβ transformation module 127 as described above.

Modulation Index Adjustment Module

In a conventional vector controlled motor drive system, the voltages applied at the machine's terminals can exhibit non-linearities with respect to commanded phase voltage. The non-linearities are caused due to non-linearities in the inverter module 110 and machine 120 due to factors such as switching limitations of the switches in the inverter module 110, voltage drops in bus bars, machine terminals, and cables, etc. Currently there is no technique for adjusting the commanded phase voltages so that the voltages applied at the machine's terminals will substantially correspond to and match commanded phase voltage.

Embodiments will now be described that can provide a mechanism for adjusting modulation index so that the phase voltages applied at the machine's terminals are made to more closely match the commanded phase voltages from the current regulator. This can reduce errors in the phase voltage applied to the multi-phase machine so that phase current may be properly regulated. As a result, current/torque oscillation can be reduced, which can in turn improve machine efficiency and performance, as well as utilization of the DC voltage source.

Figure 3:
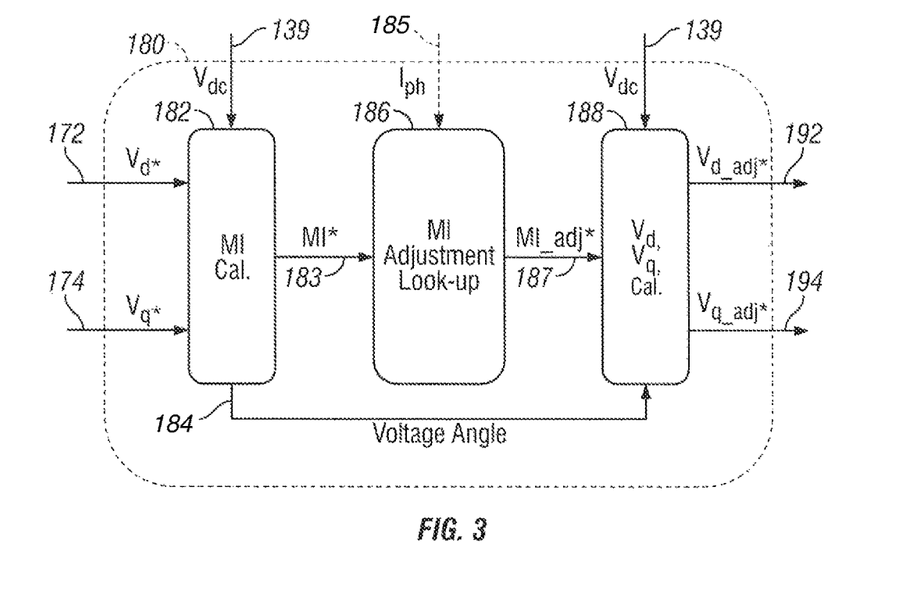
FIG. 3 is a block diagram of a voltage command adjustment processor in accordance with one implementation of the disclosed embodiments.

FIG. 3 is a block diagram of a voltage command adjustment processor 180 in accordance with one implementation of the disclosed embodiments. The voltage command adjustment processor 180 comprises a modulation index computation module 182, a modulation index lookup table 186, and a voltage command adjustment module 188.

The modulation index computation module 182 receives a synchronous reference frame d-axis voltage command signal (Vd*) 172 and a synchronous reference frame q-axis voltage command signal (Vq*) 174 from the current regulator 170 and the DC input voltage (Vdc) 139. The modulation index computation module 182 computes a modulation index (MI*) 183 and a voltage angle (Vangle) 184 based on the voltage command signals 172, 174 and the DC input voltage (Vdc) 139. The modulation index (MI), can be defined as a normalized fundamental reference voltage. As used herein, "modulation index (MI)" is the ratio of the peak fundamental phase voltage (Vph) to the maximum available voltage. The range of modulation index is from 0 to 1. The MI can be defined via the equations (3) and (4) below.

In one implementation, the modulation index computation module 182 computes the modulation index (MI*) 183 according to equations (3) and (4) as follows:

$$Vph = \sqrt{V_d^{*2} + V_q^{*2}} \tag{3}$$

$$MI = \frac{Vph}{Vdc} \cdot \frac{\pi}{2} \tag{4}$$

In equation (3), Vd and Vq are the d-axis voltage command signal (Vd*) 172 and the q-axis voltage command signal (Vq*) 174 that are output by current controller 170.

In one implementation, the modulation index computation module 182 computes the voltage angle (Vangle) 184 according to equation (5) as follows:

$$Vangle = \arctan(-V_d^*/V_q^*) \tag{5}$$

In one implementation, the modulation index lookup table 186 is a two-dimensional lookup table that receives the modulation index (MI*) 183 and a phase current (Iph) 185, and based on these inputs generates an adjusted modulation index (MI*_adj) 187. In the two-dimensional lookup table implementation, the adjusted modulation index (MI*_adj) 187 is a function of both the modulation index (MI*) 183 and the phase current (Iph) 185. The phase current (Iph) 185 can be computed via equation (6) as follows:

$$Iph = \sqrt{I_d^{2*} + I_q^{2*}} \tag{6}$$

In another implementation, the modulation index lookup table 186 is a one-dimensional lookup table that receives the modulation index (MI*) 183 and uses it to generate an adjusted modulation index (MI*_adj) 187. In the one-dimensional lookup table the adjusted modulation index (MI*_adj) 187 is a function of the modulation index (MI*) 183. To avoid two-dimensional look-up table, the inverter characterization may be done at the optimum machine operating points. The one-dimensional modulation index lookup table 186 characterizes inverter 110 performance (e.g., IGBT switching limitations, and inverter voltage drops) at optimum machine operating points to adjust the modulation index (MI*) 183. In one implementation, the inverter characterization takes place as follows. The machine is operated over the entire operating torque-speed range. As an example, every 500 rpm step and 10 Nm step. At every operating point, the modulation index (MI*) 183, the phase voltage at the machine terminals ($V_{AN}$, $V_{BN}$, $V_{CN}$) and the DC input voltage ($V_{DC}$) 139 are measured and stored. The MI measured is calculated per equation (7) as follows:

$$MI\_Measured = \frac{\frac{(V_{AN} + V_{BN} + V_{CN})}{3}}{Vdc} \cdot \frac{\pi}{2} \tag{7}$$

The adjusted modulation index (MI*_adj) 187 can then be obtained per equation (8) as follows:

$$MI\_adj^* = \text{Interpolation}(MI\_Measured, MI^*, [0:0.01:1]) \tag{8}$$

The modulation index lookup table 186 can be populated with data that is unique to the particular system. This data can be generated by using power analyzers to measure the commanded phase voltages and the resulting phase voltages at the machine terminals over a full spectrum of machine operation ranges and modulation index values so that the non-linear behavior of the system can be characterized to account for non-linearities introduced by the inverter module 110 and machine 120. In either implementation, the commanded modulation index (MI*) 183 is adjusted to generate the adjusted modulation index (MI*_adj) 187. The adjusted modulation index (MI*_adj) 187 substantially matches the modulation index (phase voltages) applied at the machine terminals. As will be explained below, the adjusted modulation index (MI*_adj) 187 effectively adjusts the magnitude of the commanded phase voltages to improve the accuracy of the phase voltages that will be applied at machine terminals (e.g., so that the phase voltages that are applied at machine terminals substantially match the commanded phase voltages).

The voltage command adjustment module 188 computes an adjusted synchronous reference frame d-axis voltage command signal (Vd_adj*) 192 and an adjusted synchronous reference frame q-axis voltage command signal (Vq_adj*) 194 based on the adjusted modulation index (MI*_adj) 187, the voltage angle (Vangle) 184 and the DC input voltage (Vdc) 139. In one implementation, the voltage command adjustment module 188 computes the adjusted synchronous reference frame d-axis voltage command signal (Vd_adj*) 192 according to equation (9) as follows:

$$Vd\_adj^* = 2 \cdot \frac{MI\_adj^*}{Vdc} \cdot \frac{-\sin(Vangle)}{\pi} \tag{9}$$

In one implementation, the voltage command adjustment module 188 computes the adjusted synchronous reference frame q-axis voltage command signal (Vq_adj*) 194 according to equation (10) as follows:

$$Vd\_adj^* = 2 \cdot \frac{MI\_adj^*}{Vdc} \cdot \frac{\cos(Vangle)}{\pi} \tag{10}$$

The adjusted synchronous reference frame d-axis voltage command signal (Vd_adj*) 192 and the adjusted synchronous reference frame q-axis voltage command signal (Vq_adj*) 194 take into account characteristics that cause non-linearities in the synchronous reference frame d-axis voltage command signal (Vd*) 172 and the synchronous reference frame q-axis voltage command signal (Vq*) 174 that can be caused by things such as switching limitations and inverter voltage drops. By using the adjusted modulation index (MI*_adj) 187 to compute the adjusted synchronous reference frame d-axis voltage command signal (Vd_adj*) 192 and the adjusted synchronous reference frame q-axis voltage command signal (Vq_adj*) 194, the magnitude of the commanded phase voltage (Vph) (e.g., equation (3) above) can be adjusted to help linearize and thus improve the accuracy of phase voltages that are eventually applied at machine terminals, which in turn helps to regulate stator currents (Ia-Ic) 122, 123, 124 that flow through respective stator windings 120a-c so that power and machine efficiency are increased.

The adjusted synchronous reference frame d-axis voltage command signal (Vd_adj*) 192 and the adjusted synchronous reference frame q-axis voltage command signal (Vq_adj*) 194 are provided to the synchronous-to-stationary transformation module 102 and used to generate stationary reference frame voltage command signals (Vα*, Vβ*) 104, 105 by performing a dq-to-αβ transformation on the adjusted voltage command signals (Vd_adj*, Vq_adj*) 192, 194.

Figure 4:
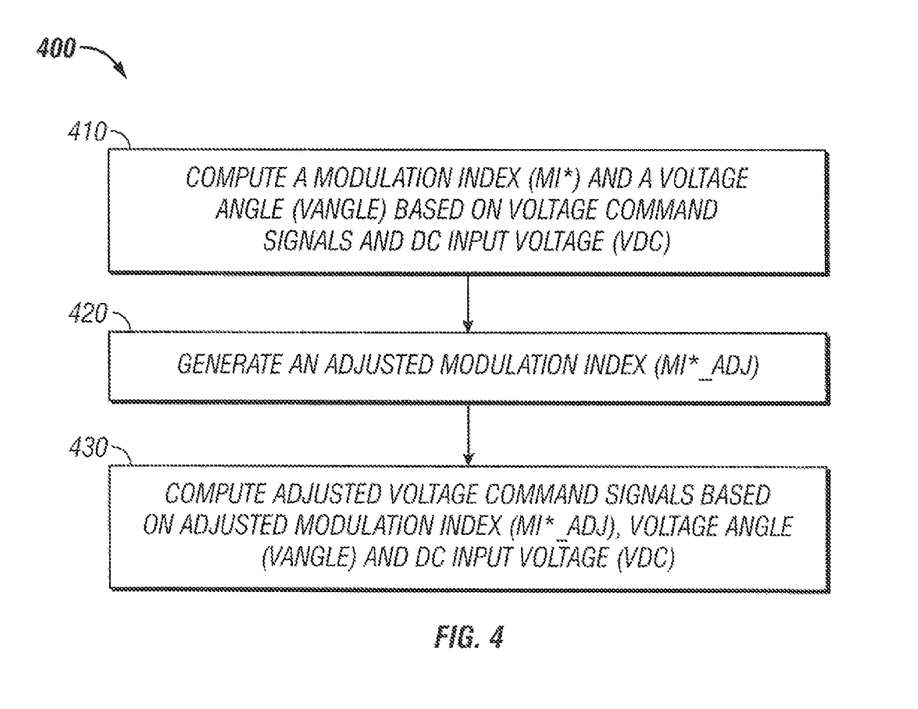
FIG. 4 is a flowchart that illustrates a method in accordance with some of the disclosed embodiments.

FIG. 4 is a flowchart that illustrates a method 400 for computing adjusted voltage command signals in accordance with some of the disclosed embodiments. At step 410, a modulation index (MI*) and a voltage angle (Vangle) are computed based on voltage command signals and a DC input voltage (Vdc). At step 420, an adjusted modulation index (MI*_adj) is generated based on the modulation index (MI*). At step 430, adjusted voltage command signals are computed based on the adjusted modulation index (MI*_adj), the voltage angle (Vangle) and the DC input voltage (Vdc).

Figure 5:
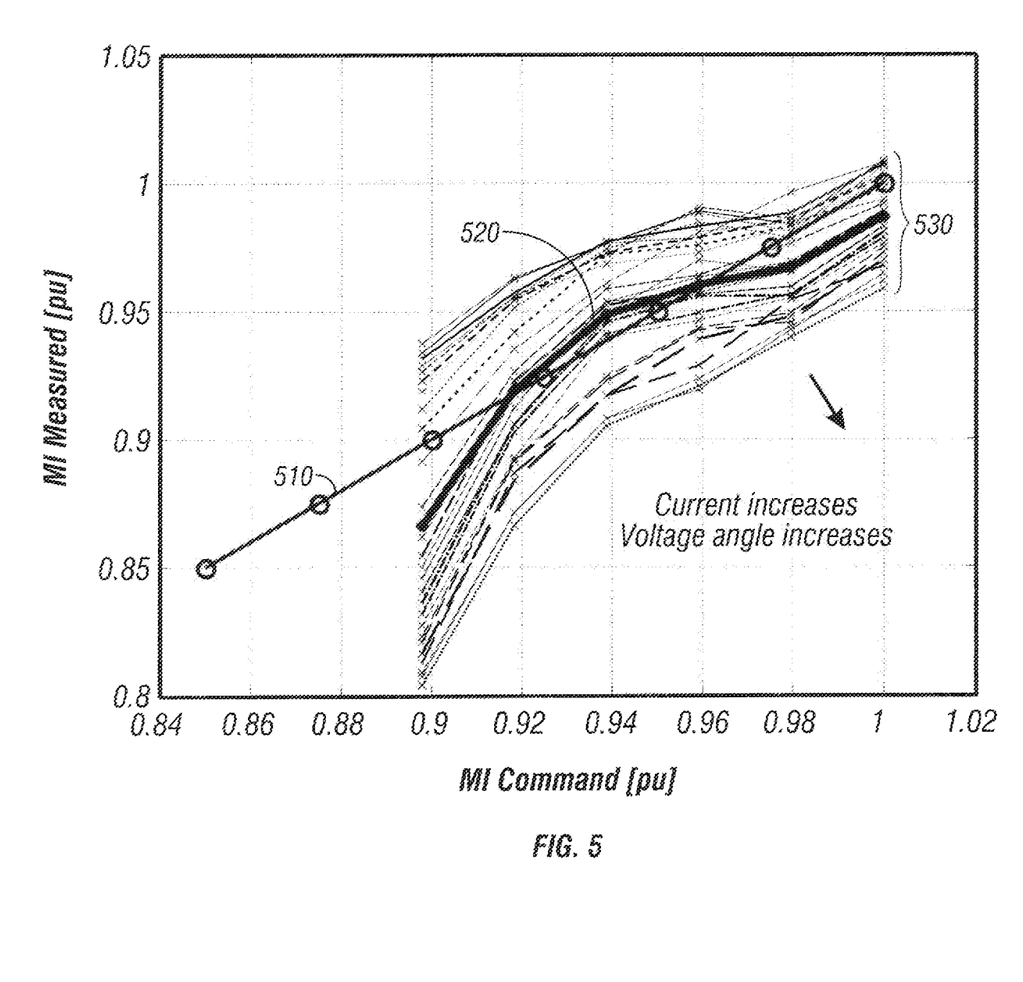
FIG. 5 is a graph that shows a set of curves that plot Measured Modulation Index (MI) as a function of a commanded Modulation Index (MI)

FIG. 5 is a set of curves that plot Measured Modulation Index (MI) at the machine terminals on the y-axis as a function of a commanded Modulation Index (MI) on the x-axis as the phase current and voltage angle (Vangle) of the phase voltage are increased. Data was generated in an open voltage loop at different modulation angles sweeping voltage angle from 0 to 125 degrees in increments of every 5 degrees and sweeping MI Command from 0.9 to 1.0 in increments of every 0.2 at 8,000 rpm. Line 510 illustrates that in an ideal system the Measured Modulation Index (MI) and the commanded Modulation Index (MI) are identical. Line 520 is the average of various plots 530. Line 520 (and the various plots 530) illustrate that in a real system, the magnitude of the phase current affects the measured Modulation Index (MI) such that the Measured Modulation Index (MI) differs from commanded MI. This is true even in a linear PWM region. The various plots 530 illustrate that at lower magnitude phase current levels, measured MI can be higher than the commanded MI due to PWM drop pulses caused by IGBT switching limitations. At higher magnitude phase current levels, measured MI is lower than the commanded MI due to voltage drops in inverter bus bars, cables and terminals.

Figure 6:
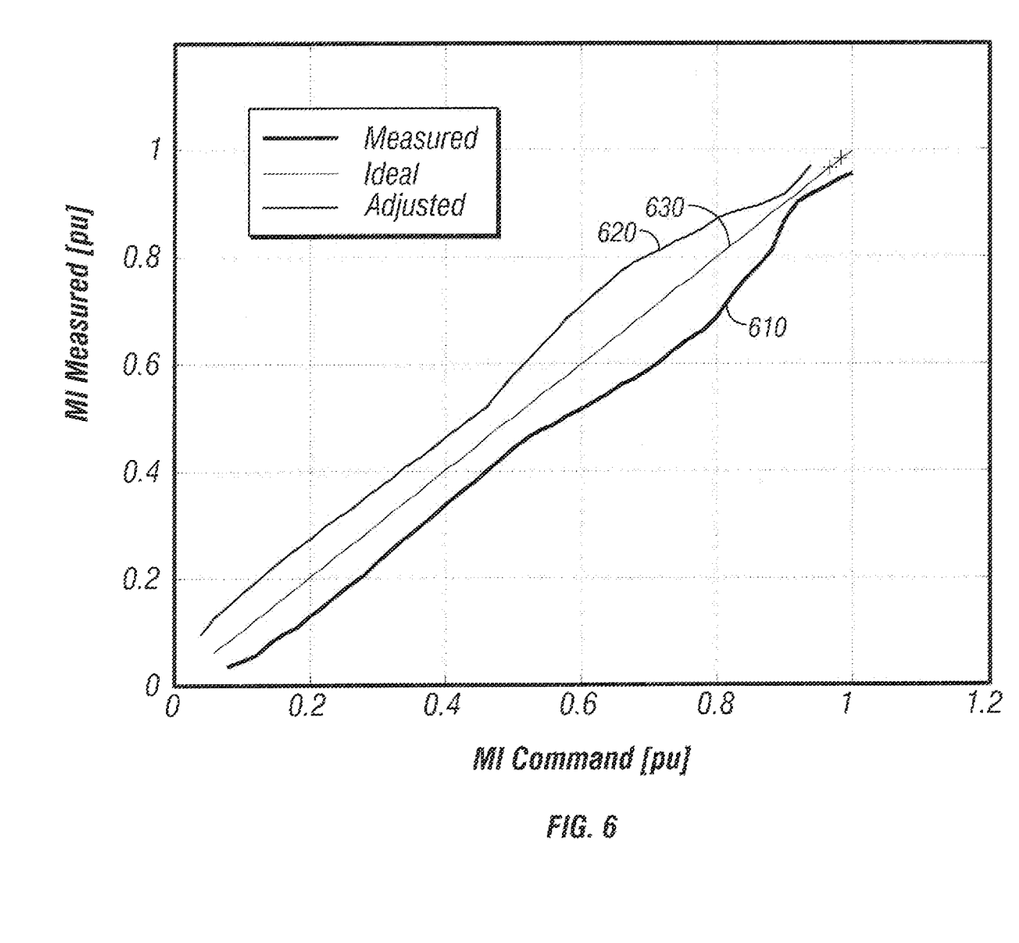
FIG. 6 is a graph that shows a set of curves that illustrate plots of a measured Modulation Index (MI) and an adjusted Modulation Index (MI*_adj) in accordance with the disclosed embodiments.

FIG. 6 are a set of curves that illustrate plots of a measured Modulation Index (MI) 610 at the machine terminals and an adjusted Modulation Index (MI*_adj) 620. Each of the plots shows the Measured Modulation Index (MI Measured) on the y-axis as a function of a commanded Modulation Index (MI) on the x-axis as the phase current was decreased. The data was generated with the voltage angle (Vangle) fixed at 105 degrees and sweeping MI from a maximum to close to zero at motor speed to 8,000 rpm. FIG. 6 illustrates that when the adjusted Modulation Index (MI*_adj) 620 is applied this causes the measured Modulation Index (MI) 610 to reach an ideal Modulation Index 630 such that the measured MI substantially matches the commanded MI.

Thus, various embodiments have been described for controlling operation of a multi-phase machine in a vector controlled motor drive system. The disclosed embodiments provide a mechanism for adjusting modulation index so that the relationship between the commanded modulation index and the measured modulation index is more linear. This can reduce variations/errors in the phase voltage applied to the multi-phase machine so that more accurate phase voltage applied to the multi-phase machine. In addition, current regulation robustness is increased in both the linear and over-modulation regions of machine operation so that phase current may be properly regulated. This reduces current/torque oscillation. Which helps increase power and improve machine efficiency and performance, as well as utilization of the DC voltage source.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for adjusting voltage command signals from a current regulator in an electric motor drive system that further comprises a multi-phase machine having machine terminals, the method comprising:
    computing a modulation index and a voltage angle based on voltage command signals provided from the current regulator and a DC input voltage, wherein the voltage angle is computed as a function of the voltage command signals;
    generating, via a lookup table, an adjusted modulation index using inputs comprising the modulation index and a phase current that is a function of a d-axis current command and a q-axis current command; and
    computing adjusted voltage command signals using the adjusted modulation index, the voltage angle and the DC input voltage,
    wherein the adjusted voltage command signals cause magnitudes of phase voltage command signals to be adjusted to substantially match applied machine terminal voltages $V_{AN}$, $V_{BN}$, $V_{CN}$ that are applied at the machine terminals.

2. A method according to claim 1, wherein the modulation index is a normalized fundamental reference voltage that is a ratio of a peak fundamental phase voltage (Vph) to a maximum available voltage.

3. A method according to claim 1, wherein the step of computing adjusted voltage command signals using the adjusted modulation index, comprises:
    computing adjusted voltage command signals using inputs comprising the adjusted modulation index, the voltage angle and the DC input voltage.

4. A method according to claim 1, wherein the lookup table is a two-dimensional lookup table that receives the modulation index and the phase current, and wherein the adjusted modulation index is a function of both the modulation index and the phase current.

5. A method according to claim 1, the method further comprising:
    generating stationary reference frame voltage command signals by performing a dq-to-αβ transformation on the adjusted voltage command signals;
    generating the phase voltage command signals based on the stationary reference frame voltage command signals;
    generating switching vector signals based on the phase voltage command signals;
    generating three-phase alternating current voltage signal waveforms based on switching vector signals and a DC input voltage; and
    applying the three-phase alternating current voltage signal waveforms to the machine terminals, wherein the adjusted voltage command signals cause magnitudes of the phase voltage command signals to be adjusted to substantially match applied machine terminal voltages $V_{AN}$, $V_{BN}$, $V_{CN}$ despite non-linearities in the electric motor drive system.

6. A method according to claim 1, wherein the voltage command signals comprise a synchronous reference frame d-axis voltage command signal and a synchronous reference frame q-axis voltage command signal, and wherein the adjusted voltage command signals comprise an adjusted synchronous reference frame d-axis voltage command signal and an adjusted synchronous reference frame q-axis voltage command signal.

7. A method according to claim 1, wherein the adjusted modulation index is used to adjust the voltage command signals and generate the adjusted voltage command signals so that the applied machine terminal voltages $V_{AN}$, $V_{BN}$, $V_{CN}$ substantially match the phase voltage command signals.

8. An electric motor drive system, comprising:
    a DC input voltage;
    a multi-phase machine having machine terminals;
    a current regulator; and a voltage command adjustment processor comprising a lookup table, wherein the voltage command processor is designed to:
  receive voltage command signals from the current regulator;
  compute a modulation index and a voltage angle based on voltage command signals and the DC input voltage, wherein the voltage angle is computed as a function of the voltage command signals;
  generate, via the lookup table, an adjusted modulation index using inputs comprising the modulation index and a phase current that is a function of a d-axis current command and a q-axis current command; and
  compute adjusted voltage command signals using inputs comprising the adjusted modulation index, the voltage angle and the DC input voltage,
  wherein the adjusted voltage command signals cause magnitudes of phase voltage command signals to be adjusted to substantially match applied machine terminal voltages $V_{AN}$, $V_{BN}$, $V_{CN}$ that are applied at the machine terminals.

9. An electric motor drive system according to claim 8, wherein the voltage command adjustment processor comprises:
  a modulation index computation module designed to receive the voltage command signals from the current regulator, and to compute the modulation index based on the voltage command signals; and
  a voltage command adjustment module designed to compute the adjusted voltage command signals based on the adjusted modulation index.

10. An electric motor drive system according to claim 9, wherein the modulation index is a normalized fundamental reference voltage that is a ratio of a peak fundamental phase voltage (Vph) to a maximum available voltage.

11. An electric motor drive system according to claim 9, wherein the lookup table is a two-dimensional lookup table that receives the modulation index and the phase current, and wherein the adjusted modulation index is a function of both the modulation index and the phase current.

12. An electric motor drive system according to claim 8, further comprising:
  a synchronous-to-stationary transformation module that generates stationary reference frame voltage command signals by performing a dq-to-αβ transformation on the adjusted voltage command signals;
  an αβ-to-abc transformation module that receives the stationary reference frame voltage command signals, and generates phase voltage command signals;
  a pulse width modulation module that generates switching vector signals based on the phase voltage command signals;
  an inverter module that generates three-phase alternating current voltage signal waveforms based on switching vector signals and a DC input, wherein the multi-phase machine is coupled to the inverter module and the three-phase alternating current voltage signal waveforms are applied to the machine terminals,
  wherein the adjusted voltage command signals cause magnitudes of the phase voltage command signals to be adjusted to substantially match applied machine terminal voltage $V_{AN}$, $V_{BN}$, $V_{CN}$ despite non-linearities in the multi-phase machine and the inverter module.

13. An electric motor drive system according to claim 8, wherein the voltage command signals comprise a synchronous reference frame d-axis voltage command signal and a synchronous reference frame q-axis voltage command signal, and wherein the adjusted voltage command signals comprise an adjusted synchronous reference frame d-axis voltage command signal and an adjusted synchronous reference frame q-axis voltage command signal.

14. An electric motor drive system according to claim 8, wherein the adjusted modulation index is used to adjust the voltage command signals and generate the adjusted voltage command signals so that the applied machine terminal voltages $V_{AN}$, $V_{BN}$, $V_{CN}$ substantially match the phase voltage command signals.

15. In a system comprising an electric motor drive system that comprises a current regulator and a multi-phase electric machine having machine terminals, a method for controlling the multi-phase electric machine, the method comprising:
  computing a modulation index and a voltage angle based on voltage command signals provided from the current regulator and a DC input voltage, wherein the voltage angle is computed as a function of the voltage command signals;
  generating, via a lookup table, an adjusted modulation index using inputs comprising the modulation index and a phase current that is a function of a d-axis current command and a q-axis current command;
  computing adjusted voltage command signals using inputs comprising the adjusted modulation index, the voltage angle and the DC input voltage, wherein the adjusted voltage command signals cause magnitudes of phase voltage command signals to be adjusted to substantially match applied machine terminal voltages $V_{AN}$, $V_{BN}$, $V_{CN}$ that are applied at the machine terminals;
  generating switching vector signals based on adjusted voltage command signals, and then generating three-phase alternating current voltage signal waveforms based on switching vector signals and the DC input voltage; and
  applying the three-phase alternating current voltage signal waveforms to the machine terminals, wherein the adjustments applied to the voltage command signals to generate the adjusted voltage command signals cause magnitudes of the phase voltage command signals to be adjusted to substantially match the applied machine terminal voltages $V_{AN}$, $V_{BN}$, $V_{CN}$ despite non-linearities in the electric motor drive system.

16. A method according to claim 15, wherein the lookup table is a two-dimensional lookup table that receives the modulation index and the phase current, and wherein the adjusted modulation index is a function of both the modulation index and the phase current.

17. A method according to claim 15, wherein the voltage command signals comprise a synchronous reference frame d-axis voltage command signal and a synchronous reference frame q-axis voltage command signal, and wherein the adjusted voltage command signals comprise an adjusted synchronous reference frame d-axis voltage command signal and an adjusted synchronous reference frame q-axis voltage command signal.

18. A method according to claim 15, wherein the adjusted modulation index is used to adjust the voltage command signals and generate the adjusted voltage command signals so that applied machine terminal voltages $V_{AN}$, $V_{BN}$, $V_{CN}$ substantially match the phase voltage command signals.

* * * * *